Oct. 21, 1952 W. DZUS 2,614,306
FASTENER STUD
Filed May 3, 1951
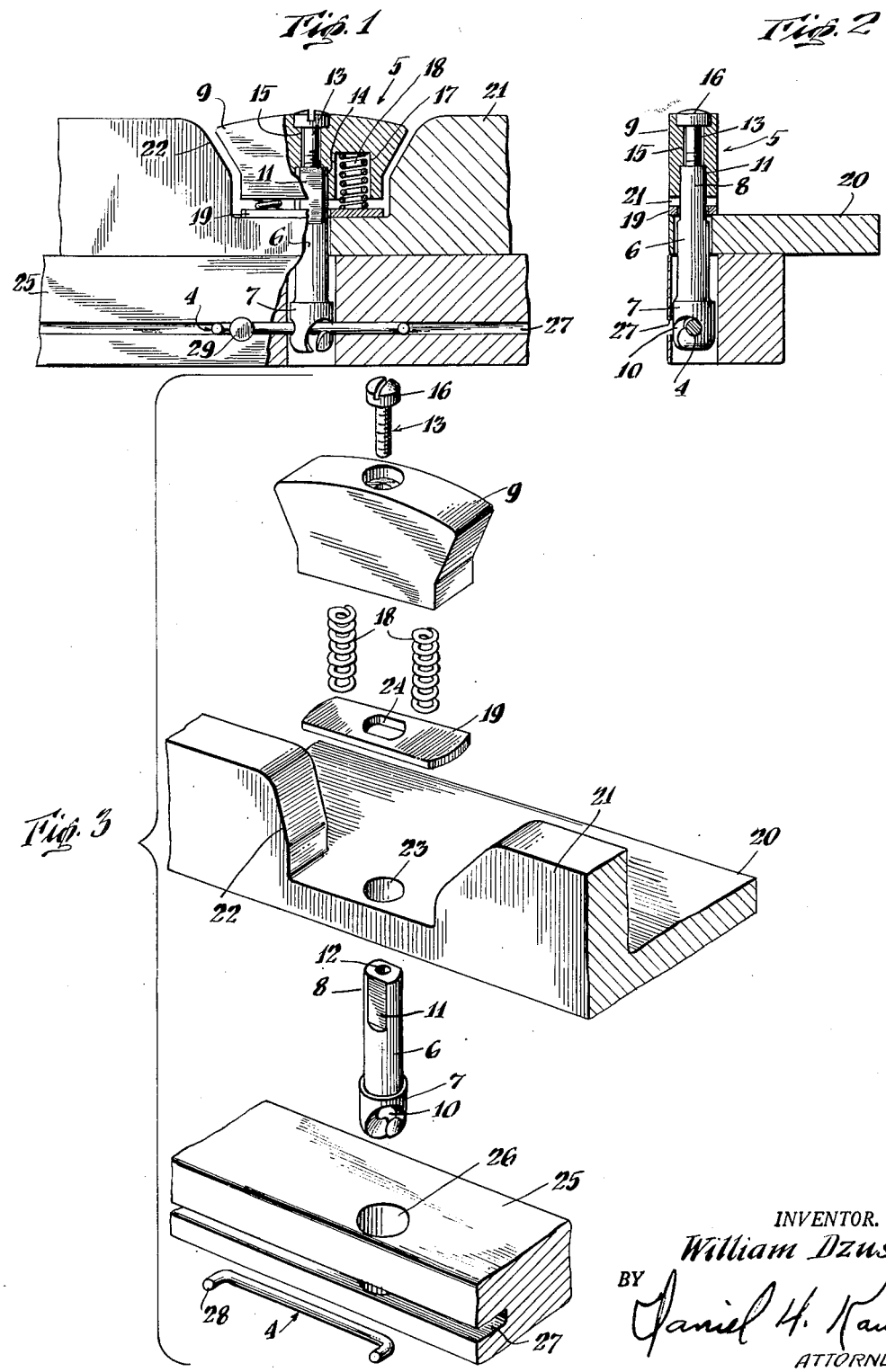
INVENTOR.
William Dzus
BY
Daniel H. Kaul
ATTORNEYS Patented Oct. 21, 1952

2,614,306

UNITED STATES PATENT OFFICE 2,614,306

FASTENER STUD

William Dzus, West Islip, N. Y.

Application May 3, 1951, Serial No. 224,274

4 Claims. (Cl. 24—221)

1

This invention relates to an improved fastening device of the quick-acting, self-locking type, and particularly to the stud portion thereof.

Quick-acting, self-locking fasteners generally consist of a stud portion and a spring or receptacle portion which are interengageable upon the rotation of one with respect to the other. The spring or receptacle portion generally occupies a greater area, particularly in width, than the stud member, and the space required for installing the fastener is generally determined by the spring or receptacle.

It is an object of the present invention to provide an improved fastening device which permits the use of a receptacle member of very small size, thereby reducing the over-all space requirements of the fastening device.

A further object is the provision of an improved fastener stud of the above character having a handle portion and resilient or spring means incorporated directly therein so that resilient or spring means can be eliminated from the receptacle member.

Another object of the invention is to provide a stud member for a quick-acting, self-locking fastener having the resilient means incorporated in the stud member and in which the force of the spring or the amount of resiliency can be readily adjusted.

A further object is the provision of an improved stud member which can be installed in a novel simplified manner without the use of retainers.

In the accompanying drawing,

Fig. 1 is an elevational view partially in section of a fastener assembly embodying my invention;

Fig. 2 is an elevational view at right angles to Fig. 1, also partially in section; and Fig. 3 is an exploded view showing the component elements of the fastener assembly and of the plates in which they are mounted.

I have illustrated my invention as incorporated in a fastening device of a spiral-cam type to which it is particularly applicable, although it should be understood that it may also be used in connection with other types of devices.

The fastener assembly consists generally of a stud member 5 and a receptacle member 4 in the form of a short length of wire. The stud member is provided with a shaft having a circular shank portion 6, a tubular locking portion 7 of greater diameter than the shank at the lower end of the shank, and a reduced attaching portion 8 of non-circular, cross-sectional shape for attaching the shaft to a wing-like handle 9. The tubular locking portion 7 is provided with spiral-cam locking means in the form of the usual diametrically opposite spiral-cam slots 10 extending inwardly from the lower end and terminating behind locking shoulders.

As previously stated, the attaching portion 8 is of suitable non-circular configuration, and this may be accomplished by providing its two opposite faces with flat surfaces 11. The attaching portion is also tapped and threaded in the manner indicated at 12 for accommodating a screw 13 which serves to attach the shaft to the handle 9. The handle 9 is provided with a centrally disposed aperture extending from top to bottom thereof. The lower portion of the aperture, indicated at 14, is of a size and shape to snugly accommodate the upper end of attaching portion 8, as shown, while the upper portion 15 of the aperture is of reduced size and serves as a stop to limit the upward movement of the attaching portion 8. The upper portion 15 accommodates screw 13 and may have a recess at its upper end for receiving the head 16.

Positioned on the two sides of the central aperture 14—15 of the head 9 and equally spaced therefrom are a pair of apertures 17 which are similar to each other and which extend upwardly from the lower surface of the head and only part way through the head. The apertures 17 serve as housings to accommodate the springs 18. The springs 18 are located in the housings 17 and project downwardly therefrom into engagement with the bearing plate 19. In this connection, the length of the springs 18 should be such that they are precompressed when the stud is assembled, as shown, so that the springs exert a downward force on bearing plate 19. By selecting the proper springs, the desired force can be obtained. This force can be adjusted or varied within limits by adjusting the screw 16. By loosening the screw, the amount of compressing and the force are decreased. By tightening the screw, the compression and force are increased.

My improved stud may be installed in an improved and simplified manner and does not require the use of retainers such as grommets, snap rings, etc. In the accompanying drawing, it is shown as installed in a plate 20 having a side flange 21 with an opening 22 large enough to accommodate the wing or handle 9. The installation is accomplished by providing the plate 20 with an aperture 23 large enough to freely accommodate the shank 6 but smaller than the locking portion 7.

The method of installing the stud in plate 20 is indicated generally in Fig. 3. Before assembling the stud, the shank 6 is projected upwardly through aperture 23, and the attaching portion 8 is then projected through aperture 24 in bearing plate 19. The aperture 24 corresponds in size and shape with the attaching portion 8 so that the stud, handle and attaching plate rotate as a unit when they are assembled. Thereafter, the springs 18 are inserted in the spring housings in handle 9, the attaching portion 8 of the stud shaft is projected into the aperture portion 14 of the handle, and screw 13 is inserted through the aperture portion 15 and then engaged with the threads of aperture 12. The screw 13 is then tightened to the proper amount to obtain the desired precompression of the spring. Generally speaking, it is preferable to fully tighten the screw. However, as previously indicated, the screw need not be tightened and may be adjusted to obtain the desired precompression of the spring.

When thus installed, the fastener stud assembly will appear as shown in Figs. 1 and 2 with the shank portion 6 disposed in aperture 23 and with the bearing plate 19 and handle 9 disposed above the plate 20 and the locking portion 7 disposed beneath the plate 20. The stud may freely rotate with respect to plate 20 but will remain attached thereto due to the handle and locking portion disposed, respectively, above and below the plate.

The receptacle may take the form of a piece of wire 4 of a size to be engaged in the spiral-cam slots 10 of the stud member. The wire is assembled with the base plate 25 in any desired manner. As shown, the plate is provided with an aperture 26 large enough to accommodate the locking portion 7 of the stud. In the illustrated embodiment, the plate 25 is provided with a horizontal slot 27 extending inwardly from one side thereof and intersecting the aperture 26. The wire 4 is inserted in the slot 27 so as to extend diametrically across the aperture 26 and is then suitably held in place.

To prevent the wire from rotating in the slot, it may be provided with terminal portions 28 extending at right angles to the body of the wire as shown. If the wire is of a size to frictionally engage the sides of a slot, no additional wire retainers are required, otherwise the wire may be welded or staked, or held in place by frictional inserts such as shown at 29 in Fig. 1.

When the stud and receptacle have been assembled with the plates 20 and 25 respectively, they may be interengaged by superimposing the plates with the apertures 23 and 26 in alignment with each other and projecting the locking portion of the stud member into the aperture 26 until the slots 10 engage the wire 4. The handle 9 may then be grasped in the hand of the operator and rotated in a clockwise direction for about a quarter-turn with the result that the spiral-cam slot and the wire 4 become interengaged, drawing the locking portion, shank, and handle of the stud downwardly. This action is resisted by the springs 18 which are further compressed by the downward shifting of the stud. Plate 19 serves as a bearing plate and rests on the surface of plate 20 and slides thereon as the stud is rotated. Due to the interengagement between the bearing plate and the mounting plate 20, the lower end of the springs do not shift downwardly as the shank of the stud and the handle shift downwardly during the locking operation.

When the stud has been rotated to fully locked position, the wire 4 is locked behind the shoulders of the spiral-cam slots. The force exerted by the springs serves to retain the fastener in fully locked position against accidental release even under extreme conditions of vibration.

To unlock the fastener, the handle is again grasped in the hand and rotated in a counter-clockwise direction for approximately a quarter-turn. The result is that the wire is released from the slots 10 and the stud is free to move upwardly.

It will thus be seen that I have provided an improved fastening device which requires a minimum amount of space, which is simple to install and in which the spring force can be readily adjusted.

Modifications may be made in the illustrated and described embodiment of my invention without departing from the invention as set forth in the accompanying claims.

I claim:

1. In a quick-acting fastening device of the spiral-cam type in which a spiral-cam stud member is engageable with a receptacle member upon the rotation of one member with respect to the other, a fastener stud assembly comprising: a shank portion formed with spiral-cam locking means at the lower end thereof; an enlarged head portion at the upper end of the shank portion, said enlarged head portion being formed with apertures in the lower surface thereof; a bearing plate slidably mounted on the shank portion beneath the head portion and shiftable towards and away from the head portion; and springs disposed in the apertures of the head portion and engageable with the upper surface of the bearing plate to normally shift the bearing plate away from the head portion.

2. In a quick-acting fastening device for securing two parts together of the type in which a stud member is engageable with a receptacle member upon the rotation of one member with respect to the other, an improved fastener stud assembly comprising: a cylindrical shank portion formed with locking means at its lower end and with a non-cylindrical stem of smaller cross-sectional area than the shank portion at its upper end and having a shoulder serving as a stop at the point of juncture between the stem and shank portions; an enlarged head portion having a stem-receiving opening of substantially similar cross-sectional size and shape as the stem and also having spring-receiving openings on opposite sides of the stem receiving opening, said stem-receiving opening being in engagement with the stem of the shank and secured thereto so that rotation of the head portion causes rotation of the shank portion and said non-cylindrical stem being longer than the stem-receiving opening so that it extends downwardly beneath the head portion; a bearing plate slidably mounted on the non-cylindrical stem of the shank portion beneath the head portion and being shiftable towards and away from the head portion, said bearing plate having an opening corresponding in size and shape to the cross-sectional size and shape of the stem so that the bearing plate cannot rotate with respect to the stem and so that the aforesaid shoulder prevents the plate from shifting below the stem; and helical springs disposed in the spring-receiving openings and projecting outwardly into engagement with the bearing plate for normally shifting the bearing plate away from the head portion.

3. In a quick-acting fastening device for securing two parts together of the type in which a stud member is engageable with a receptacle member upon the rotation of one member with respect to the other, an improved fastener stud assembly of the type set forth in claim 2 in which the lower end of the shank portion is of larger cross-sectional area than the upper end of the shank portion.

4. In a quick-acting fastening device for securing two parts together of the type in which a stud member is engageable with a receptacle member upon the rotation of one member with respect to the other, an improved fastener stud assembly as set forth in claim 2 in which the upper end of the stem is provided with a threaded opening and the stem-receiving opening in the head extends only part way through the head and communicates with a screw-receiving opening of smaller size which extends through to the opposite side of the head and a screw is provided which extends through the screw-receiving opening into the threaded opening in the stem, said screw-receiving opening being recessed to accommodate the head of the screw at said opposite side of the head.

WILLIAM DZUS.

REFERENCES CITED

The following references are of record in the file of this patent:

UNITED STATES PATENTS

| Number | Name | Date |
| --- | --- | --- |
| 167,853 | Morand | Sept. 21, 1875 |
| 906,607 | Bessette | Dec. 15, 1908 |
| 1,298,251 | Pehel | Mar. 25, 1919 |
| 1,369,754 | Nixon | Feb. 22, 1921 |
| 1,384,459 | Grover | July 12, 1921 |
| 1,603,159 | Snyder | Oct. 12, 1926 |
| 1,671,241 | Hagger | May 29, 1928 |
| 2,123,068 | Summers | July 5, 1938 |
| 2,313,358 | Periman | Mar. 9, 1943 |
| 2,551,400 | Sorensen | May 1, 1951 |